(12) United States Patent
Anagnostopoulos

(10) Patent No.: US 11,426,782 B2
(45) Date of Patent: Aug. 30, 2022

(54) SYSTEM FOR CLEANING, PROTECTING AND LUBRICATING HYPERBOLIC ROLLERS AND BEARINGS PLACED IN A ROTATING ROTOR WHICH IS USED FOR STRAIGHTENING WIRE, ROD OR REINFORCING BAR, USING AIR AND OIL

(71) Applicant: Antonios Anagnostopoulos, Athens (GR)

(72) Inventor: Antonios Anagnostopoulos, Athens (GR)

( * ) Notice: Subject to any disclaimer, the term of this patent is extended or adjusted under 35 U.S.C. 154(b) by 1142 days.

(21) Appl. No.: 15/753,101

(22) PCT Filed: Dec. 27, 2017

(86) PCT No.: PCT/GR2017/000073
§ 371 (c)(1),
(2) Date: Feb. 15, 2018

(87) PCT Pub. No.: WO2019/130026
PCT Pub. Date: Jul. 4, 2019

(65) Prior Publication Data
US 2020/0206801 A1    Jul. 2, 2020

(51) Int. Cl.
*B21D 37/18*    (2006.01)
*B21D 3/04*    (2006.01)
(Continued)

(52) U.S. Cl.
CPC .............. *B21D 37/18* (2013.01); *B08B 9/027* (2013.01); *B08B 9/0321* (2013.01);
(Continued)

(58) Field of Classification Search
CPC ... B21D 3/04; B21D 3/06; B21D 3/08; B21D 37/18; B21F 1/02; B21F 1/023; B21B 27/06; B21B 27/08; B08B 9/027
See application file for complete search history.

(56) References Cited

U.S. PATENT DOCUMENTS 613,754 A * 11/1898 Brightman ............ B21B 13/008
72/78
3,663,397 A * 5/1972 Le Bras ................. C25D 13/24
204/482
(Continued)

FOREIGN PATENT DOCUMENTS

GB    711 991 A    7/1954
JP    2000 005821 A    1/2000

OTHER PUBLICATIONS

PCT/GR2017/000073, International Preliminary Report on Patentability dated Jun. 30, 2020, 7 pages—English.

*Primary Examiner* — Edward T Tolan
(74) *Attorney, Agent, or Firm* — Andrew F. Young; Nolte Lackenbach Siegel

(57) ABSTRACT

A system and method for cleaning, protecting and lubricating hyperbolic rollers and bearings for bending, using air and oil, placed in a rotating rotor (1) that contains rollers (32) placed on bearings (34) and shafts (33) inside roller housings (30), where rollers (32) are positioned at an angle with respect to the bending axis and, as bending occurs they cause bending and also as rotor (1) rotates around the item being bent it straightens and feeds the item. Rollers (32) are placed on bearings (34) and are protected through rotational seals (35). The bearings' (34) area of rollers (32) inside the rotational seal (35) is supplied with air at pressure higher than the atmospheric, so that inflow of contaminants are inhibited, or is supplied with air enriched with oil so that bearings (34) are lubricated, and rotational seals (35) located next to bearings (34) of the rollers (32) allow the air flow from the area between the bearings towards the surrounding area.

11 Claims, 8 Drawing Sheets

(51) Int. Cl.
*B23Q 11/10* (2006.01)
*B21B 27/06* (2006.01)
*B08B 9/027* (2006.01)
*B08B 9/032* (2006.01)
*B21F 1/02* (2006.01)

(52) U.S. Cl.
CPC .......... *B08B 9/0323* (2013.01); *B08B 9/0325* (2013.01); *B08B 9/0328* (2013.01); *B21B 27/06* (2013.01); *B21D 3/04* (2013.01); *B21F 1/02* (2013.01); *B23Q 11/10* (2013.01); *B08B 2203/005* (2013.01); *B08B 2205/00* (2013.01); *B08B 2209/032* (2013.01)

(56) References Cited

U.S. PATENT DOCUMENTS

| | | | | |
|---|---|---|---|---|
| 3,672,197 A * | 6/1972 | Popov | ............... | B21D 3/06 72/79 |
| 4,920,776 A * | 5/1990 | Denzler | ............... | B21F 1/023 72/79 |
| 5,042,280 A * | 8/1991 | Anagnostopoulos | .... | B21D 3/06 72/70 |
| 5,208,956 A * | 5/1993 | Wenzel | ............... | B21B 27/055 492/5 |
| 5,520,039 A * | 5/1996 | Albert | ............... | B21D 3/05 277/412 |
| 9,415,430 B2 * | 8/2016 | Rebs | ............... | F16C 33/6662 |

* cited by examiner

SECTION C-C

SECTION D-E-E-D

SYSTEM FOR CLEANING, PROTECTING AND LUBRICATING HYPERBOLIC ROLLERS AND BEARINGS PLACED IN A ROTATING ROTOR WHICH IS USED FOR STRAIGHTENING WIRE, ROD OR REINFORCING BAR, USING AIR AND OIL

CROSS REFERENCE TO RELATED APPLICATIONS

This application relates to, and claims priority from, PCT Ser. No. PCT/GR2017/000073 filed Dec. 27, 2017, the entire contents of which are incorporated herein by reference.

FIGURE SELECTED FOR PUBLICATION

FIG. 3B.

BACKGROUND OF THE INVENTION

Field of the Invention

The present invention relates to to a system and method for cleaning, protecting and lubricating with a mixture of air and lubricant oil the hyperbolic rollers and their respective bearings installed in a rotor. The invention further relates to a system and method where hyperbolic rollers are placed in a rotor, which rotates and whose rotational movement, forces the rollers to simultaneously rotate around the wire, rod or re-bar axis. More particularly, the invention further relates to a system and method for cleaning, protection and lubrication of the hyperbolic rollers and bearings during rotation of the rotor that is achieved through the use of a mixture of air and lubricant oil which is distributed via an oil-tight channel network.

Description of the Related Art

The rotor with rollers, FIG. 1A, FIG. 1B, straightens a wire, rod or re-bar and is the central mechanism of a straightening machine or of a straightening unit.

The hyperbolic rollers are placed on bearings, which are protected by rotational seals. The rollers are separately lubricated with grease when the rotor does not rotate.

The rotor is used for straightening wire or re-bar. The hyperbolic rollers straighten the wire, rod or re-bar and rotate with hundreds to thousands of revolutions per minute, depending on the processed wire, rod or re-bar diameter.

Wires are usually surface coated with oil for oxidation protection purposes and rod or re-bars with residue of calamine and scale remains deriving from the production process. Quite often the wire, rod or re-bar is also oxidized.

During conventional rotor operation, as the wire, rod or re-bar goes through the straightening rollers, it is bent on all directions, resulting in the abruption and removal of the residues, calamine, scale and rust from the surface of the wire, rod and re-bar, and which as a result accumulate on the rollers and their respective bearings causing a detriment. This accumulation of the residue particles eventually passes through the rotary seals and accelerates the premature failure of the bearings and the rollers, resulting in the necessity of early replacement.

Unfortunately, the conventional solution to the problem is the frequent lubrication of the rollers, which entails frequent production interruptions.

Furthermore, this conventional solution requires a strict and well organized maintenance plan, where the maintenance team has to comply with the servicing guidance, which is usually not followed in operational conditions.

Accordingly, there is a need for an improved system and method for cleaning, protecting and lubricating hyperbolic rollers and bearings placed Ma rotating rotor.

ASPECTS AND SUMMARY OF THE INVENTION

In response, to the concerns noted, one objective of the present invention is the presentation of a system for cleaning, protecting and lubricating of the rollers of a rotor, which will prevent contamination of the rollers and their respective bearings, clean them from incoming residue, lubricate the bearings and where this system will be activated without rotor operation stoppage.

According to another alternative aspect of the present invention, the invention is applicable to any type of rotor with rollers, to wire, rod and re-bar straightening machines with one or multiple straightening lines, and can be operated automatically or manually, during use or between uses.

According to another alternative aspect of the present invention, there is provided a system for cleaning, protecting and lubricating hyperbolic rollers and bearings, using air and oil, placed in a rotating rotor, which is used for straightening wire, rod or reinforcing bar, and contains rollers placed on bearings and shafts inside roller housings, where rollers are positioned at an angle with respect to the wire, rod or re-bar axis, they bend the wire, rod or re-bar, and as rotor rotates around the wire, rod or re-bar longitudinal axis it straightens and feeds the wire, rod or re-bar, and where rollers are placed on bearings and are protected through rotational seals. The bearings' area of rollers inside the rotational seal is supplied with air at pressure higher than the atmospheric, so that inflow of contaminants from the environment is inhibited, or is supplied with air enriched with oil so that bearings are lubricated, and rotational seals located next to bearings of the rollers allow the air flow from the area between the bearings towards the surrounding area.

According to another alternative aspect of the present invention, there is provided, a system for cleaning, protecting and lubricating hyperbolic rollers and bearings, using air and oil, in a rotating rotor, which is used for straightening wire, rod or reinforcing bar, and contains hyperbolic rollers placed on bearings and shafts inside roller housings, where hyperbolic rollers are positioned at an angle with respect to the wire, rod or re-bar axis, they bend the wire, rod or re-bar, and as rotor rotates around the wire, rod or re-bar longitudinal axis it straightens and feeds the wire, rod or re-bar, and where hyperbolic rollers are placed on bearings and are protected through rotational seals, which is characterized by: the bearings' area of hyperbolic rollers inside the rotation gaskets that is supplied with air at pressure higher than the atmospheric, so that inflow of contaminants from the environment is inhibited, bearings that are kept clean from foreign particles, and that air mixed with oil is supplied so that bearings are lubricated, where rotation seals next to bearings of the hyperbolic rollers allow for air flow from the area between the bearings towards the surrounding area.

According to another alternative aspect of the present invention, there is provided, a system where a key characteristic is that time intervals for supply of air and of air enriched with oil that are scheduled and depend on the operational conditions of bearings of hyperbolic roller, i.e. the load, revolutions per minute and contamination by external particles.

According to another alternative aspect of the present invention, there is provided, a system where a key characteristic is that air and air enriched with oil is transferred from the supply location on bearing up to the hyperbolic rollers through gaskets and channels on bearing, and on the rotor shell.

According to another alternative aspect of the present invention, there is provided, a system where a key characteristic is that air and air enriched with oil is distributed to the rollers through flow control valve.

According to another alternative aspect of the present invention, there is provided, a system where a key characteristic is that the rotational seals of the hyperbolic rollers allow the supply of air from the bearings' interior to the environment, flow regulating the air and preventing the insertion of contaminants from the surrounding area towards the hyperbolic roller interior.

According to another alternative aspect of the present invention, there is provided, a system where a key characteristic is that the rotational seals of the hyperbolic rollers can be of a labyrinth type.

According to another alternative aspect of the present invention, there is provided, a system where a key characteristic is that the bearings' cleaning and lubrication process is fully automated and controlled through a computer or electronic controller.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1A:
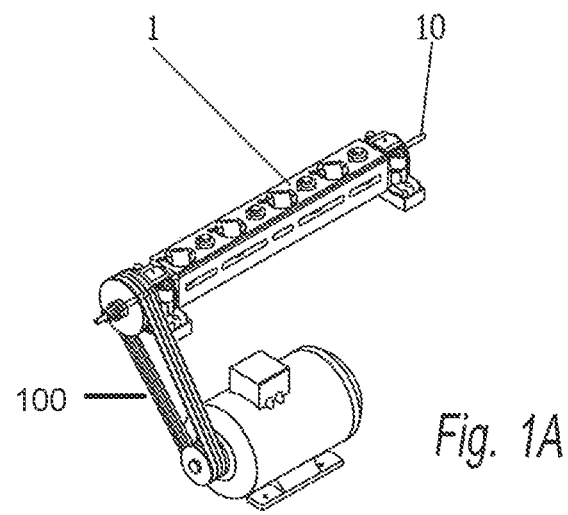
FIG. 1A depicts a straightening rotor with rollers and its driving motor.
Figure 1B:
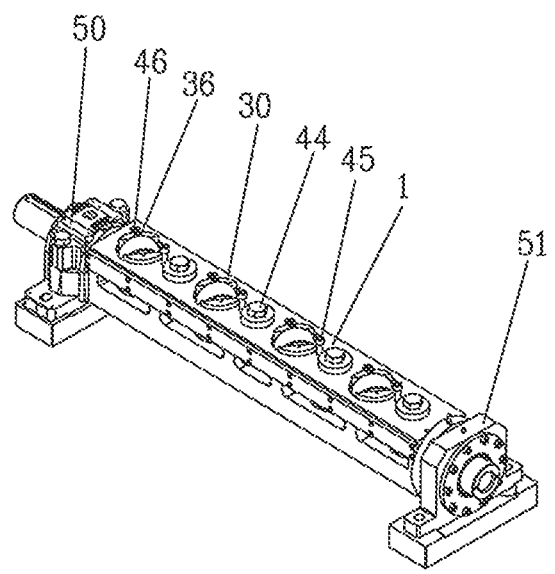
FIG. 1B depicts a straightening rotor with the lubrication system.
Figure 2A:
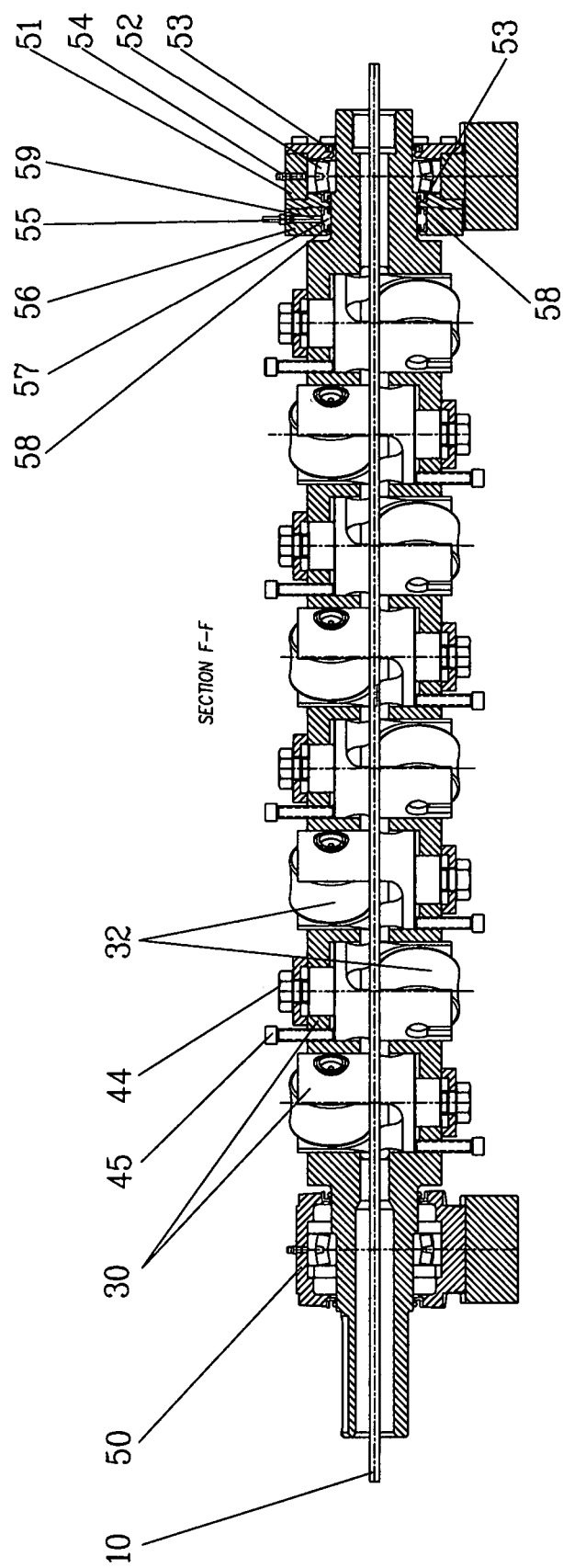
FIG. 2A depicts a cross section of the straightening rotor along its length.
Figure 2B:
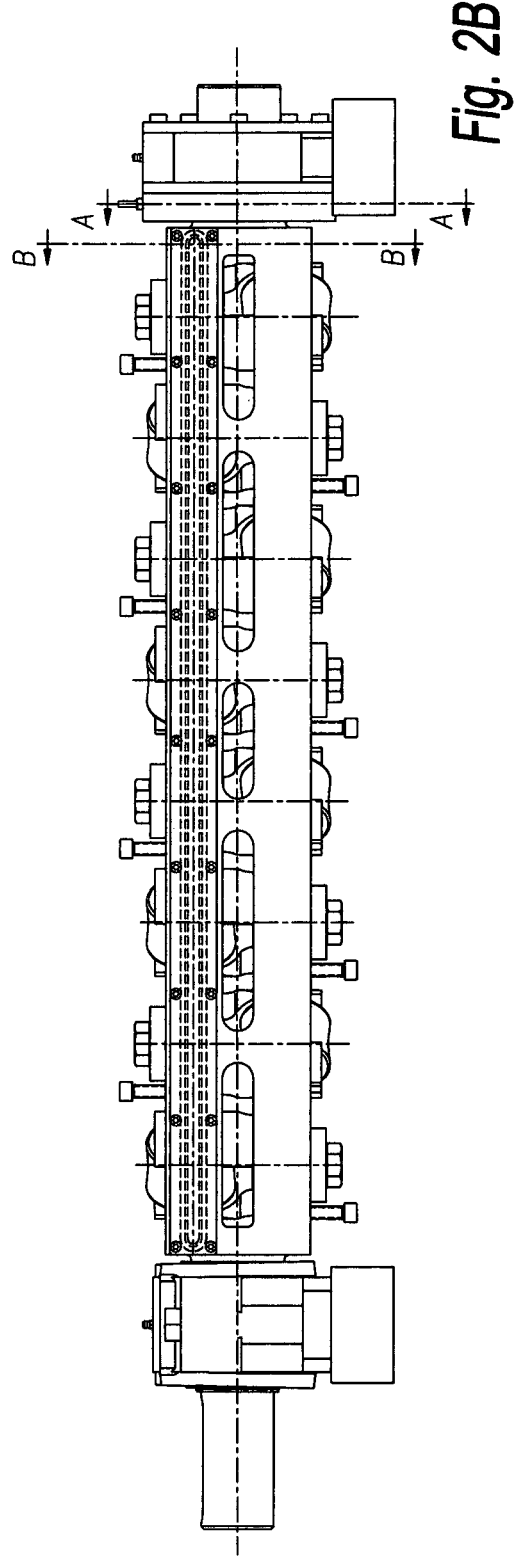
FIG. 2B depicts a side view of the straightening rotor.
Figure 2D:
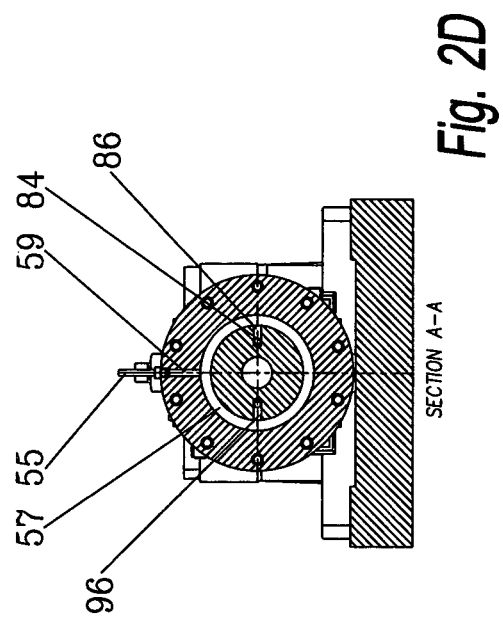
FIG. 2D depicts a transversal cross section of the rotor.
Figure 2C:
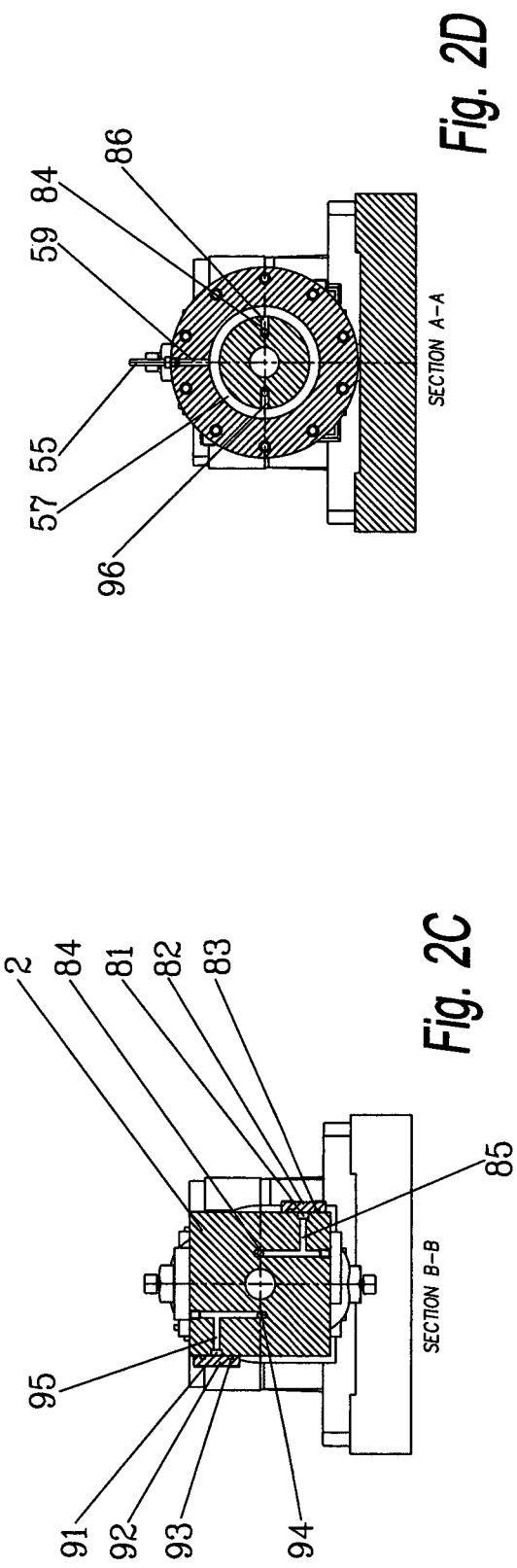
FIG. 2C depicts a transversal cross section of the rotor.
Figure 2E:
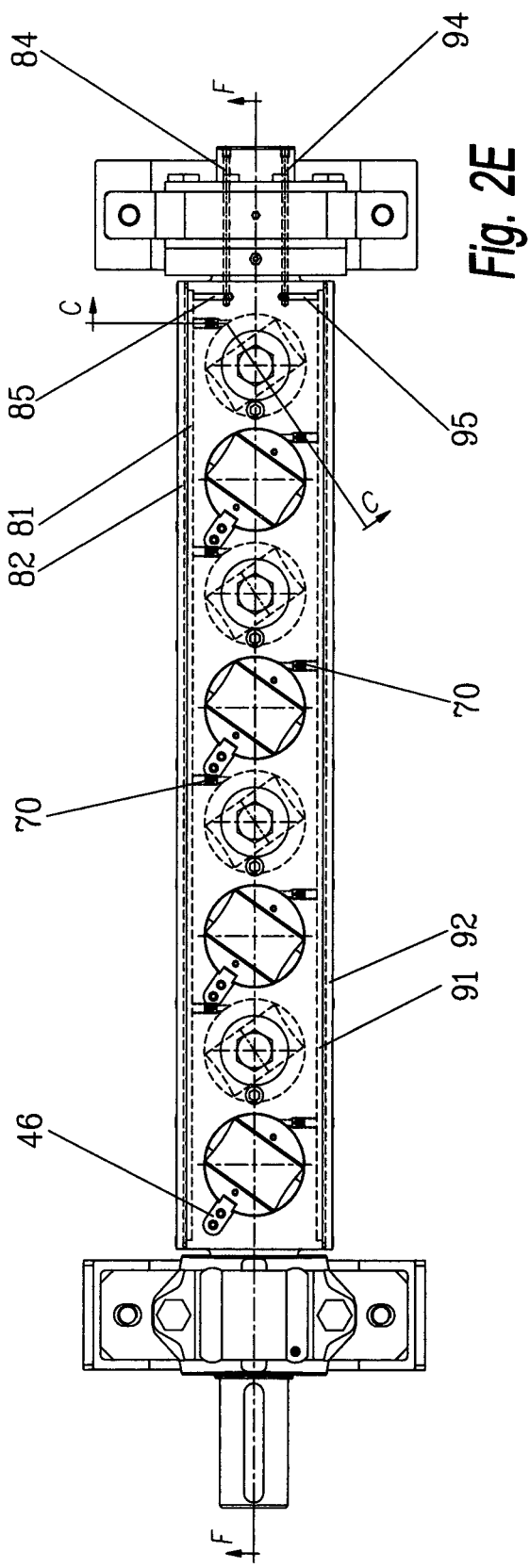
FIG. 2E depicts a top view of the rotor.
Figure 2F:
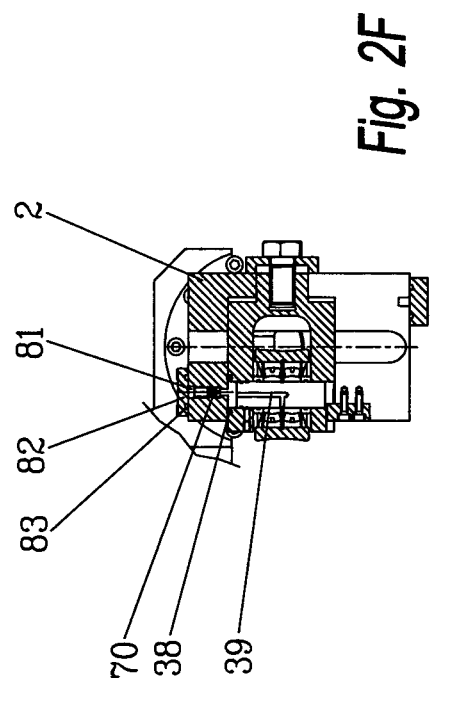
FIG. 2F depicts a partial sectonal oblique view of the rotor, explaining the details of a roller.
Figure 2G:
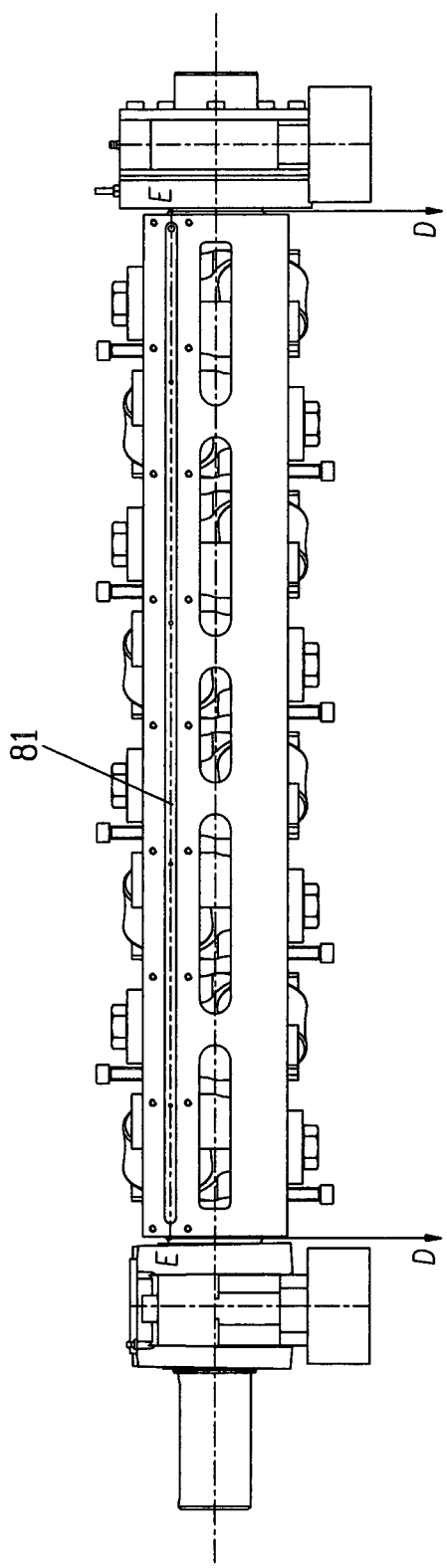
FIG. 2G depicts a side view of the rotor, indicating the supply line of air and oil along the length of the rotor.
Figure 2H:
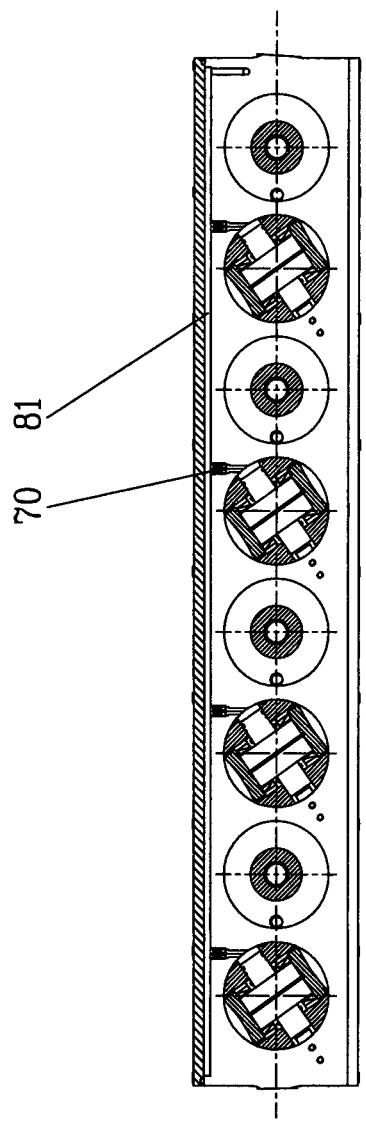
FIG. 2H depicts a cross section top view of the rotor.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

In the present text, numerous specific details are set forth in order to provide a thorough understanding of exemplary versions of the present invention. It will be apparent, however, to one skilled in the art, that some versions of the present invention may possibly be practiced without some of these specific details. Indeed, reference in this specification to "a variant," "variants," and "one/the variant," or "one version," "a version" and the like, should be understood to mean that a particular feature, structure, or characteristic described in connection with the variant or version is included in at least one such variant or version according to the disclosure. Thus, the appearances of phrases such as "in one variant," "in one version," and the like, in various places in the specification are not necessarily all referring to the same version or variant, nor are separate or alternative versions or variants mutually exclusive of other versions or variants. Moreover, various features may be described which possibly may be exhibited by some variants or versions and not by others. Similarly, various requirements are described which may be requirements for some variants or versions, but not others. Furthermore, as used throughout this specification, the terms 'a', 'an', 'at least' do not denote a limitation of quantity, but rather denote the presence of at least one of the referenced item, in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

Various operations may be described as multiple discrete operations in turn, in a manner that may be helpful in understanding embodiments of the present invention; however, the order of description should not be construed to imply that these operations are order dependent.

Rotor (1) (FIG. 1A, FIG. 2B, FIG. 2A, FIG. 2E) driven by an electrical motor and belt arrangement 100 providing a revolution per minute, consists of a rotor shell (2), which houses at least three roller housings (30), whereas in the implementation example figures of the present invention the roller housings are eight.

Figure 3A:
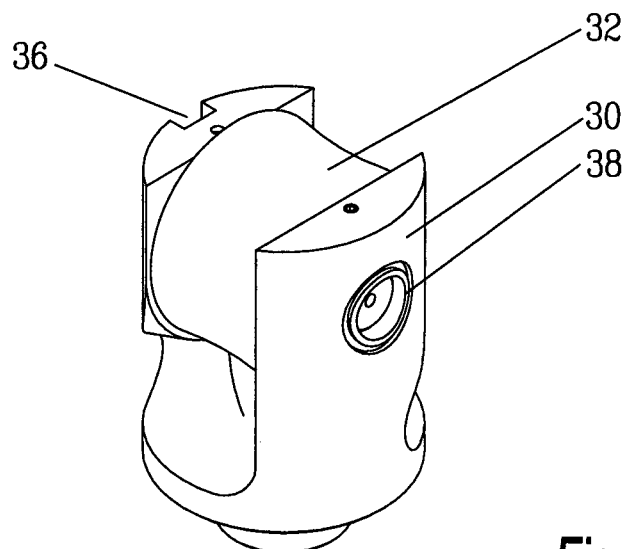
FIG. 3A depicts a roller housing and its roller.
Figure 3B:
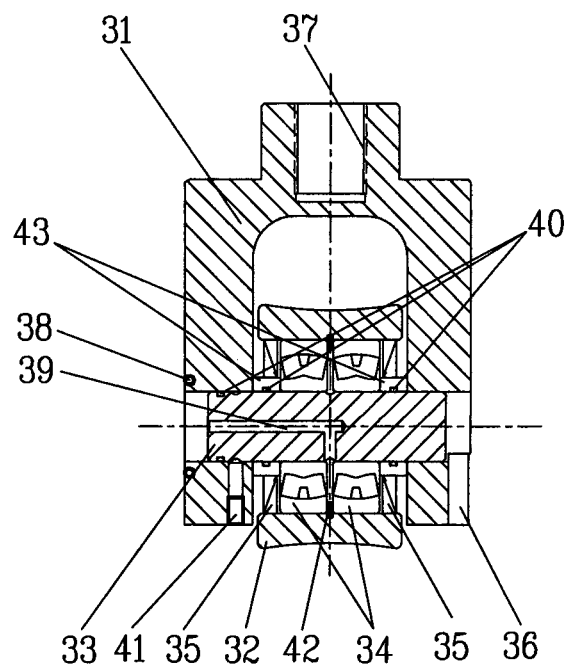
FIG. 3B depicts a roller housing (inverted) and a cross section of its roller.

The roller housing (30), FIG. 3A, FIG. 3B, consists of the roller housing body (31), and of the roller (32), which is installed in the roller housing. Roller (32) is placed on the body of the roller housing (31) through the bearings (34), the safety lock (42), the spacer rings (43), the shaft safety pin (41) and the shaft (33). The bearings (34) are protected by two seals (35) placed one per bearing side. The shaft (33) area is sealed from the rotor shell (2) through the O-ring (38), which is installed into a slot on the body of the roller housing (31). Furthermore, there are O-ring sealings (40) for sealing the bearings' (34) area inside the roller (32). Shaft (33) has perforations (39), which allow entry of air and oil to the bearings (34). Thread (37) in the roller housing (30) is used for regulating the roller (32) position with respect to the wire, rod or re-bar (10) axis, and a keyway (36) is used to maintain constant roller (32) angle with respect to the wire or re-bar (10) axis.

A rotor has eight roller housings (30) with eight hyperbolic rollers (32) which are installed in the rotor arranged in two sets of four, opposite to each other and at an angle with respect to the wire, rod or re-bar (10) axis. The angle of roller (32) is determined by the keyway (36) and the guide (46), whereas the roller (32) position with respect to the wire, rod or re-bar (10) axis is determined by a regulating screw (44) and it is secured by a securing screw (45).

Rollers (32) are pressed against the wire, rod or re-bar (10) imposing alternating bending stresses upon it. The rotor with the roller housings, is supported on bearing housings (50), (51), and rotates around the wire (10) axis. Through the rotor rotation, the wire, rod or re-bar (10) moves forward and is simultaneously straightened.

Rotation of the rotor causes rollers (32) to rotate around the wire, rod or re-bar (10) axis and around the roller housing shaft (33).

The rotor's bearing housing (50) has a bearing and is lubricated with grease through the respective greasing point (noted but not numbered). Bearing housing (51) has a bearing (52) located between rotational seals (53) and is lubricated with grease through the respective greasing point (54).

Lubrication of rollers (32) is achieved through a supply line (55), which is located on flange (56), and which directs oil and air from the first internal chamber (57) between rotation gaskets (58) and finally through channels from chamber (57) to rollers (32), during the rotor rotation.

Two channels (81), (91) are cut in, at the two sides of the rotor body.

Channel (81) is covered by a metal plate (82), which is sealed through O-ring (83) and is secured on the rotor shell with screws. The air and oil mixture from chamber (57) is driven towards channel (81) through holes (86), (84) and (85). Through four holes and four flow regulating valves (70) air and oil are driven from channel (81) to the four roller housings.

Channel (91) is covered with a metal plate (92), which is sealed through O-ring (93) and is fixed on the rotor shell with screws. Air and oil from chamber (57) are driven towards channel (91) through holes (96), (94) and (95). Through four holes and four flow regulating valves (70) air and oil are driven from channel (91) to the four opposite roller housings.

Figure 4A:
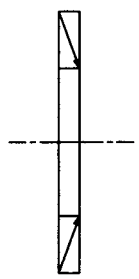
FIG. 4A depicts schematically a rotational seal
Figure 4B:
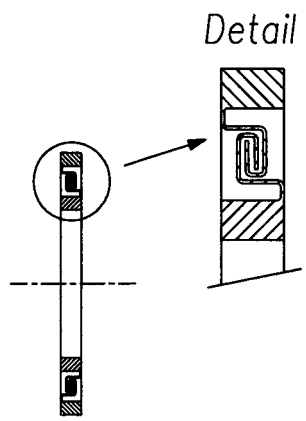
FIG. 4B depicts schematically a rotational seal with labyrinth channels.
Figure 4C:
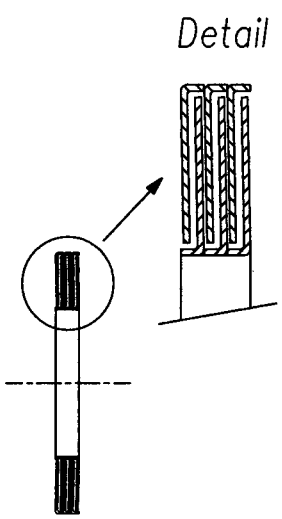
FIG. 4C depicts schematically a rotational seal with labyrinth channels.
Figure 4D:
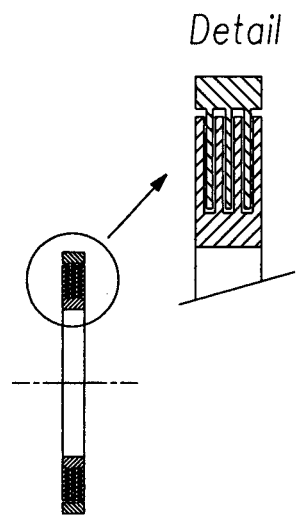
FIG. 4D depicts schematically a rotational seal with labyrinth channels.
Figure 5:
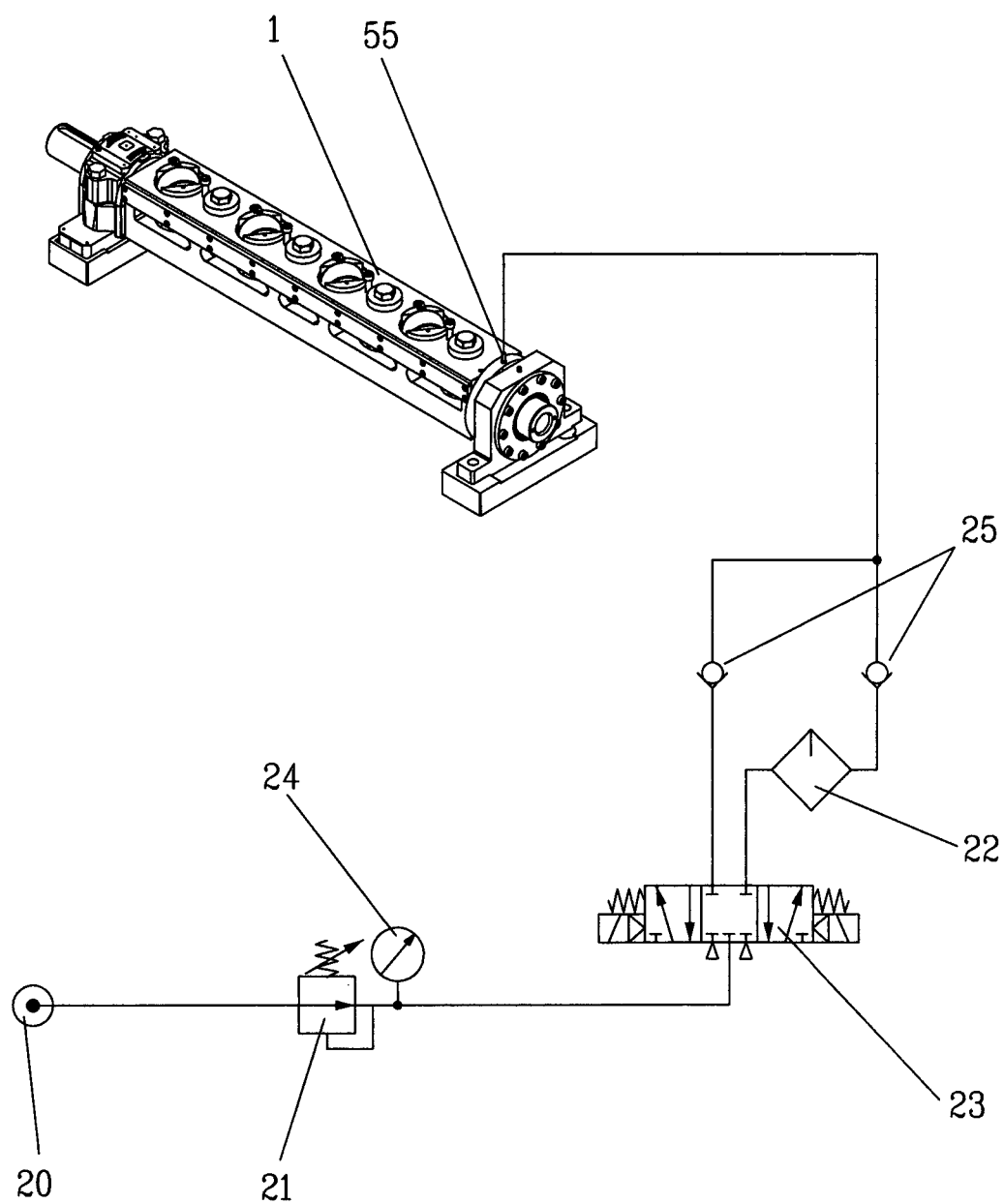
FIG. 5 depicts the system of air-oil supply lines.

The rollers' (32) seals (35) are schematically presented in FIG. 4A. Their shape can be of any configuration that allows air to flow from the interior to the exterior and to block inflow of air from the exterior to the interior. Examples of such labyrinth type of seals are presented in FIGS. 4B, 4C and 4D.

The supply of air and oil circuit is presented below.

Activating the valve at its first position, compressed air is supplied towards the rollers, whereas at its second position the valve allows supply of air, enriched with oil, towards the rollers. In the middle position the valve does not allow the flow of air or oil towards the rollers. Two non-return valves (25) isolate the occasional supply of air or air and oil towards the rollers.

Activation of the valve determines the required time for filling the rollers area with air and the required time for lubricating the rollers with air enriched with oil.

Through the system that was described, air and oil are led to the bearings of the roller housings.

The position (depth) of the roller housing is adjustable in order to impose the appropriate force on the wire, rod or re-bar.

Air and oil are led through channels (81), (91) towards the bearings (34) of roller (32) of roller housing (31) via the flow regulating valve (70). The roller housing area is sealed through O-ring (38), which is located on a circular slot on the roller housing surface. The shape of the slot determines the location of the O-ring and the degree of the displacement of the roller housing inside the rotor.

Keyway (36) and guide (46) determine the roller (32) angle with respect to the wire, rod or re-bar (10) axis. This angle remains usually constant during the rotor operation. The roller housing (30) can be rotated about its axis so that the roller (32) angle with respect to the wire, rod or re-bar (10) can vary. In this case cleaning and lubrication are ensured, since the supply (55) of air and oil remain inside the area enclosed by the O-ring, as the roller housing is displaced and rotated.

The area of the bearings (34) and the rollers (32) can be at a higher pressure than the atmospheric one, by the supply of compressed air, so that the inflow of contaminants is inhibited. Lubrication of the bearings is achieved by activating the flow of air enriched with oil. The time intervals of supply of compressed air and the duration of lubrication depend on the operational conditions, revolutions and loads applied on the hyperbolic rollers and bearings, as well as on the amount of contaminants from the wire, rod and re-bar.

The process of cleaning, protecting and lubricating of the bearings and the roller housings of the rotating rotor can be fully automated and controlled by a computer or electronic controller.

Advantages

The system and method presents the following advantages.

The system and method maintains the bearings' area clean from contaminants, since their area is subject to controlled pressure conditions, and also kept under a minor but continuous supply of air which repels incoming contamination particles.

By activating the supply of oil through the air circuit, lubrication with air-oil mixture of the bearings of the rollers, smooth operation is secured.

General Issues on Protection

The present invention is by no means limited to the implementation described above and through the attached drawings, but it can be implemented in various forms and dimensions without deviating from the protection framework of the invention.

For implementation of the invention, the materials used and the dimensions of the individual parts can be in accordance with the requirements of each individual application.

In every claim, wherein technical characteristics are referred to and are followed by reference numbers, these are included solely to increase the comprehension of the claims and in this manner the reference numerals do not affect the consideration of the elements, which are exemplarily recognizable by them.

LIST OF REFERENCE NUMBERS AND NAMES

1: Rotor.
2: Rotor shell.
10: Wire, rod or re-bar.
20: Supply of compressed air.
21: Air pressure regulator.
22: Air lubricator.
23: Air-oil supply activation valve.
24: Air pressure measuring gauge meter.
25: Non-return valves.
30: Roller housing.
31: Roller housing body.
32: Hyperbolic roller
33: Roller housing's roller shaft.
34: Roller housing's bearings.
35: Roller housing's rotational seals
36: Roller housing's keyway.
37: Roller housing's thread for depth regulation.
38: O-ring for sealing flow of air-oil towards the roller housing.
39: Perforations for supply channels of air-oil to the shaft towards the bearings.
40: Sealing O-ring.
41: Pin-screw for stabilization of the roller shaft.
42: Safety lock.
43: Spacer rings.
44: Screw for regulation of the roller housing's depth.
45: Roller housing's safety screw.
46: Roller housing's guide.
50: Rotor bearing.
51: Rotor bearing with air-oil supply.
52: Rotor bearing of (51)
53: Rotor bearing rotational seal (51)
54: Rotor bearing greasing point (51)
55: Supply of air-oil for lubrication of bearings of the rollers
56: Air-oil supply flange.
57: Air-oil supply chamber inside the flange (56)
58: Rotational seals
70: Flow regulation valves.
81: Channel along the rotor length.
82: Metal plate channel cover (81)
83: Channel O-ring seal (81)
84: Perforation along the rotor length.
85: Perforation vertically to the rotor length.
91: Channel along the rotor length.
92: Metal plate channel cover (91)
93: Channel O-ring seal (91)
94: Perforation along the rotor length.
95: Perforation vertically the rotor length.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. A system for cleaning, protecting and lubricating hyperbolic rollers (32) and bearings (34), in a rotating rotor (1) used for straightening a bent item having a longitudinal axis, comprising:

a plurality of hyperbolic rollers (32) each placed on a respective bearing (34) having a bearing interior, and a shaft (33) inside a roller housing (30);

each said hyperbolic rollers (32) positioned at an angle with respect to the bent item and operative to bend said bent item as said rotor (1) rotates around the longitudinal axis of said bent item and feeds the bent item to said hyperbolic rollers (32);

each said hyperbolic roller (32) placed on a respective said bearing (34) that is protected through a respective rotational seal (35);

a bearing (34) area of each said hyperbolic roller (32) is inside the rotational seal (35); and at least one of a high pressure air and a high pressure air/oil mixture provided along a supply pathway to said bearing (34) area and said bearing interior during a use of said system, thereby prohibiting an inflow of contaminants to each said bearing (34) area or said bearing interior.

2. The system as in claim 1, wherein:

said system further comprises:

a means for determining a revolution per minute of each said bearing (34) of said hyperbolic roller (32); and means for supplying said at least one of said high pressure air and said high pressure airfoil mixture at previously specified time intervals.

3. The system as in claim 2, further comprising:

a bearing (51) on said rotating rotor (1);

a shell (2) on said bearing (51);

a supply reservoir on said bearing (51) in fluid connection through said shell (2) with said supply pathway and each said bearing (34) area of each said hyperbolic roller (32) and inside each said rotational seal (35).

4. The system as in claim 3, further comprising:

at least one control valve (70) in fluid communication with said supply pathway whereby each said hyperbolic roller (32) and each said bearing area is supplied with said at least one of said high pressure air and said high pressure air/oil mixture.

5. The system as in claim 3, wherein:

each said rotational seal (35) of each said hyperbolic roller (32) includes a contour profile allowing allow the supply of air from said interior of each said bearings (34) and an interior of each said hyperbolic roller (32) outward to an environment, thereby preventing an insertion of contaminants from said environment towards respective said interiors.

6. The system as in claim 3, further comprising:

a labyrinth type seal in each said rotation seal (35) of said hyperbolic rollers (32).

7. A system of a rotating rotor (1) for straightening a bent item, comprising:

hyperbolic rollers (32) placed on bearings (34) and shafts (33) inside roller housings (30);

said hyperbolic rollers (32) being positioned at an angle with respect to the bent item and an axis defined by the rotating motor (1), said system of a rotating motor (1) further comprises:

a system for cleaning, protecting and lubricating said hyperbolic rollers (32) and said bearings (34) using air and oil;

wherein said bearings (34) are protected through rotational gasket seals(35) so as to define a plurality of bearing areas the hyperbolic rollers (32) inside the rotational gasket seals (35);

means for supplying air at a pressure higher than atmospheric to said beating areas inside said rotational gasket seals (35) so that an inflow of contaminants is inhibited and said bearings (34) are kept clean from foreign particles; and said system for cleaning, protecting and lubricating provides an air/oil mixture to lubricate said bearings (34) of the hyperbolic rollers (32) proximate the rotational gasket seals (35) and to allow air flow away from an internal area between respective bearings (34).

8. The system, according to claim 7, further comprising:

means to schedule time intervals for supply of said air and said air/oil mixture.

9. The system, according to claim 7, wherein:

said rotating rotor (1) has a shell (2) mounted on bearings (50, 51); and at least one of said bearings (51) is provided with a supply reservoir location so that said air and said air/oil mixture are transferred from said supply reservoir location to the hyperbolic rollers (32) through a plurality of gaskets and channels on said one of said bearings (51) on the shell (2) of rotating rotor (1).

10. The system, according to claim 7, further comprising:

flow control valves (70) are provided through which air and the air/oil mixture are distributed to the hyperbolic rollers (32).

11. The system, according to claim 7, wherein:

the gasket seals (35) the hyperbolic rollers (32) are adapted to allow the supply of air from the internal area between the beatings (34) to an external environment, thereby preventing a contaminant reaching the internal area between the hyperbolic rollers (32).

* * * * *